Nov. 2, 1954   H. E. TEBBETTS, JR., ET AL   2,693,224
METHOD OF MAKING MOLDED RUBBER BALLS WITH LACING
Filed May 11, 1953
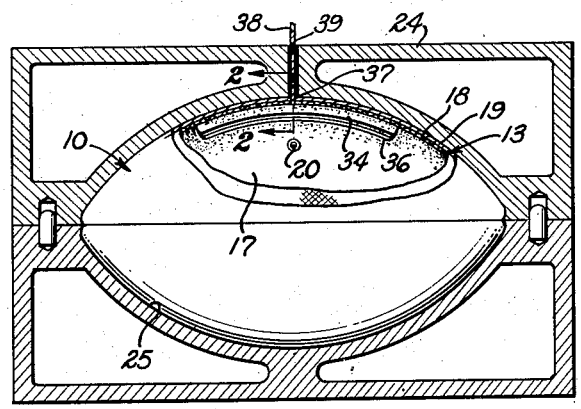
Fig. 1
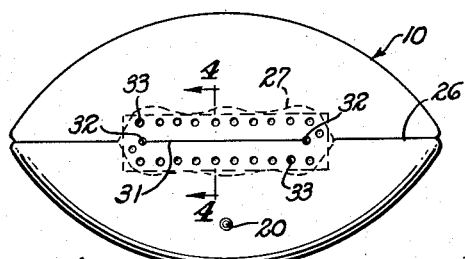
Fig. 3
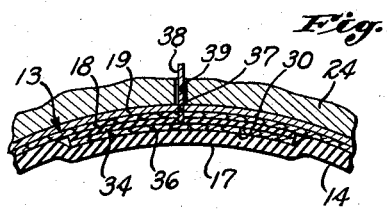
Fig. 2
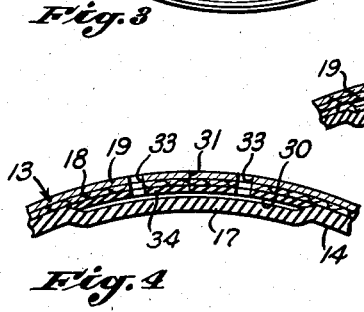
Fig. 4
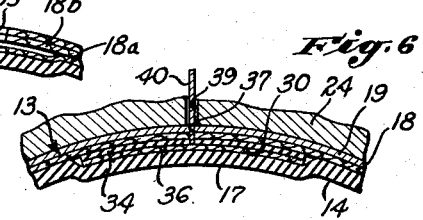
Fig. 8   Fig. 6
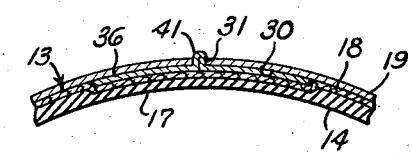
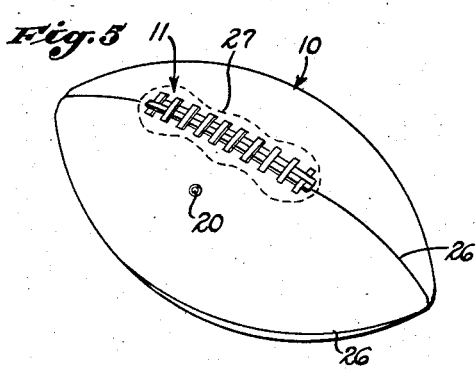
Fig. 5
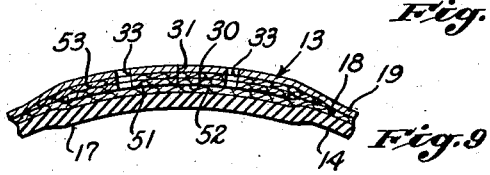
Fig. 7   Fig. 9
INVENTORS:
HERBERT EDWIN TEBBETTS JR.
ROBERT BRUCE HENDERSON
BY THEIR ATTORNEYS
HARRIS, KIECH, FOSTER & HARRIS United States Patent Office 2,693,224
Patented Nov. 2, 1954

2,693,224

METHOD OF MAKING MOLDED RUBBER BALLS WITH LACING

Herbert Edwin Tebbetts, Jr., and Robert Bruce Henderson, Whittier, Calif., assignors to W. J. Voit Rubber Corp., Los Angeles, Calif., a corporation of California Application May 11, 1953, Serial No. 354,124

15 Claims. (Cl. 154—16)

This application is a continuation-in-part of our co-pending application Serial No. 100,222, filed June 20, 1949.

Our invention relates in general to molded rubber articles and their manufacture and, more particularly, to athletic balls of molded rubber. The term "moldable material," as used herein, is intended to include not only natural rubber but any synthetic materials, such as the so-called "synthetic rubbers," thermoplastics, and thermosetting resins.

The invention is of particular utility in athletic or game balls which are inflatable, and we prefer to consider the invention in this connection herein for convenience in disclosing same. An inflatable game ball of the type under consideration is of laminated construction, several layers or laminae of rubber and fibrous material customarily being employed. The usual practice is to use an inner, gas-retaining layer or bladder of rubber, one or more intermediate, reinforcing layers of rubber, and an outer, wear-resisting layer which serves as a cover. The reinforcing layer, or layers if more than one are employed, may consist of pieces of rubberized fabric bonded to the bladder, or may consist of fibrous thread or cord wound around the bladder and bonded thereto. The cover may be formed of any suitable wear-resisting material and may be bonded to the reinforcing material. The cover may be formed of leather, for example, although we prefer to provide a cover of moldable material, and a ball having a cover of the latter material will be considered herein for convenience in disclosing the invention.

Heretofore, in making balls with molded rubber covers, it has been the practice to simulate the lacing conventionally used with leather-covered balls, the imitation lacing being molded directly into the cover and forming an integral part thereof. The purpose of doing this is, of course, to simulate the surface characteristics of conventional leather-covered balls, such simulation being particularly desirable in footballs, for example, wherein the lacing is customarily gripped by the fingers of a player passing the ball.

However, molding an imitation lacing on the cover of the ball in this manner does not simulate an actual lacing with sufficient exactitude to make the resulting ball universally acceptable, and it is, therefore, a primary object of our invention to provide a molded ball having a separate, removable lacing so that its surface characteristics more nearly simulate those of a conventional leather-covered ball. Another object is to provide a method of making such a ball.

One object of the invention is to provide a molded ball of laminated construction wherein two of the laminae forming the wall of the ball are bonded together throughout only part of the surface area of the ball, the two laminae referred to being unbonded throughout a relatively small surface area of the ball to provide a pocket therebetween. The portion of the wall of the ball overlying this pocket is provided with two rows of holes through which a lacing is threaded. The pocket may, as desired, be formed between the outer cover and the outer fabric reinforcing layer, where the cover is bonded to the outer reinforcing layer, or between two of the reinforcing layers which are bonded together, or between the bladder and the inner reinforcing layer when the bladder is bonded to the inner reinforcing layer.

Another object of the invention is to provide a ball of the foregoing character wherein a layer of moldable material of substantially the same size and shape as the pocket is bonded to the layer inwardly of and registering with the pocket so as to form the inner wall thereof. This additional layer serves to reinforce the bladder in the vicinity of the pocket in the wall of the ball, which is a feature of the invention. Also, this additional layer provides a somewhat greater over-all wall thickness in the vicinity of the lacing, and thus provides somewhat more bulk in the vicinity thereof, whereby to simulate more closely the characteristics of a conventional leather-covered ball, which is another feature of the invention.

Another object of our invention is to provide a method of making a ball of the foregoing character which involves placing intermediate the two layers between which the desired pocket is to be formed a layer of separating material of a size and shape corresponding to the desired size and shape of the pocket, such separating layer being placed between the two layers mentioned before bonding them together. The separating layer comprises a material, such as paper or fabric for example, which is not bondable to the two layers between which it is disposed and its function is to prevent bonding of the two layers to be separated so as to provide the desired pocket. Also, certain thermoplastic cements may be used to form such separating layer, which cements will prevent the walls of the pocket from bonding together during the cure but which will release after a normal cure of the ball. For example, a thermoplastic material such as a vinyl chloride and vinylidene chloride copolymer may be used to form the separating layer, this material being particularly advantageous in that it does not react chemically with rubber, or similar materials, and does not produce gases which would tend to inflate the pocket upon removal from the mold. Also, a conventional animal glue solution can alternatively be used for the separating layer.

Another object is to apply a thermoplastic separating material of the character indicated to the under side of a piece or patch of rubberized fabric to form a separating coating thereon, such fabric patch being the same size as the desired pocket and being applied to a fabric reinforcing layer which envelops the bladder. Thus, the separating material prevents bonding of this fabric patch to such reinforcing layer to form the pocket, this fabric patch having superimposed thereon another larger piece or patch of rubberized fabric which is bonded or vulcanized to the inner patch and to the underlying reinforcing layer around the inner patch to provide two fabric plies over the pocket.

Other objects of our invention include the provision of a method which involves slitting that portion of the wall of the ball which overlies the pocket formed by the separating layer, removing the separating layer from the pocket through the slit (which is unnecessary if a thermoplastic separating material of the character referred to above is used), punching rows of holes on opposite sides of the slit through the overlying portion of the wall of the ball, and threading a lacing through the holes and across the slit to lace the edges of the slit together.

Another object is to provide for venting the pocket formed by the separating layer before removal of the ball from a mold in which it is cured so as to permit the escape of any air trapped in the pocket. This prevents any tendency of the laminae bounding the pocket to separate adjacent the edges of the pocket due to expansion of entrapped air upon removal of the ball from the mold, which is an important feature of the invention. Such venting is unnecessary if a thermoplastic separating material coating is used in the manner hereinbefore indicated since no air, or a negligible amount of air, is trapped and no gases are formed by the separating material, which is an important feature.

Another object is to provide a novel method of venting the pocket, when necessary, which comprises forming a hole through the portion of the wall of the ball which overlies the pocket prior to placing the ball in the mold, and which comprises inserting a piece of material in this hole to prevent closing of the hole when the ball is cured in the mold. Any air trapped in the pocket escapes through the material inserted in the vent hole. It is also an object of the invention to provide an alternative method of venting the pocket, which includes the step of forming an opening through the outer wall of the pocket before removal of the ball from the mold to permit escape of any gas under pressure trapped in the pocket. Another alternative method of relieving gas pressure in the pocket which has been built up during the molding operation is to chill the mold while the ball is still therein to reduce the temperature and, consequently, the pressure of any gas trapped in the pocket, and thus is a further object of the invention.

A further object of the invention is to stitch together the layers forming the pocket around the periphery of the pocket, so as to confine in the pocket any gas formed therein and to prevent separation of such layer outside the area of the pocket.

Another object is to provide a method of making a ball of the foregoing nature which is characterized by the use of a separating layer for forming the pocket and for simultaneously forming the slit or other equivalent opening in the outer wall of the pocket.

The foregoing objects and advantages of our invention, together with various other objects and advantages thereof which will become apparent, may be obtained through the utilization of the exemplary embodiments which are illustrated in the accompanying drawing and which are described in detail hereinafter. Referring to the drawing:

Fig. 1 is a side elevational view, partly in section, illustrating a football which embodies the invention and illustrating one step in the manufacture of the ball;

Fig. 2 is an enlarged, fragmentary sectional view taken along the broken line 2—2 of Fig. 1;

Fig. 3 is a plan view of the ball prior to incorporating a lacing therein;

Fig. 4 is an enlarged fragmentary sectional view taken along the broken line 4—4 of Fig. 3;

Fig. 5 is a perspective view of a completed football which embodies the invention;

Fig. 6 is a view which is similar to Fig. 2, but which illustrates an alternative structure and an alternative venting method;

Fig. 7 is a view similar to Figs. 2 and 6, but illustrating an alternative method of forming the desired slit in the outer layer of the ball and illustrating still another venting method;

Fig. 8 is a view similar to Fig. 4 which illustrates another embodiment of the invention; and Fig. 9 is a view similar to Fig. 4 which illustrates a further embodiment of the invention.

Referring to Figs. 1 to 5 of the drawing, we show a ball 10 of molded construction which is provided with a removable lacing 11, shown in Fig. 5 of the drawing. The ball 10 is inflatable and deflatable and includes a wall structure 13 which defines a space 14 for an inflating gas such as air.

As best shown in Figs. 1, 2, and 4 of the drawing, the wall structure 13 of the ball is of laminated construction, and for illustration, includes three layers or laminae in the particular construction illustrated, there laminae being identified by the numerals 17, 18, and 19. The innermost lamina 17 is preferably formed of a moldable material and is adapted to retain air or other gas in the space 14, a suitable inflating valve 20 being permanently secured to the lamina 17 and extending through the laminae 18 and 19 in a manner not specifically shown but well known in the art. The lamina 17 is, in effect, a bladder and will be referred to as such hereinafter.

The lamina 18 is disposed intermediate the bladder 17 and the outermost lamina 19 and is preferably bonded thereto so that, in effect, the wall structure 13 is of integral construction. The intermediate lamina 18 reinforces the wall structure of the ball and may be formed of any suitable material, although a material of a fibrous nature is preferred. For example, the reinforcing lamina or layer 18 may be formed of rubberized fabric bonded to the laminae 17 and 19, or may be formed of thread or cord wound around the bladder 17 and bonded to the bladder and the lamina 19. Although we have shown but a single reinforcing layer 18, it will be understood that more than one may be employed if desired.

The outer lamina 19 constitutes a cover for the ball and may be formed of any suitable wear-resisting material. For example, the cover 19 may comprise leather bonded to the reinforcing layer 18, although we prefer to provide a ball wherein the cover is formed of a moldable material.

As is well known in the art, in making a ball of the foregoing character, the first step is to take a bladder 17 of rubber and partially inflate it to a size somewhat less than the desired size of the finished ball. A coating of a vulcanizable material, such as latex or rubber cement, may then be applied to the bladder 17, as by dipping or spraying, for example. Subsequently, the reinforcing layer 18 is applied to the coated bladder, pieces of fabric being placed on the bladder if a fabric reinforcing layer is used, and thread or cord being wound thereon if a wound reinforcing layer is used.

Another coating of vulcanizable rubber material is then applied to the reinforcing layer 18, the cover 19 subsequently being placed on the reinforcing layer. Thereafter, the ball is placed in a suitable mold, such as a mold 24, having a cavity 25 corresponding in size and shape to the size and shape desired for the finished ball. If a rubber cover 19 is used, the wall of the mold cavity 25 may be provided with ridges, or the like, to produce any desired design on the surface of the finished ball. In the particular construction illustrated wherein our invention is embodied in a football, the wall of the mold cavity 25 is preferably provided with ridges which produce grooves 26 in the outer surface of the ball 10 to simulate the grooves obtaining at the seams of a conventional leather-covered football. Also, the wall of the mold cavity may be formed to produce imitation stitching 27 around the removable lacing 11 and to produce imitation pebbling.

After the ball has been placed in the mold cavity 25, it is further inflated to press the cover 19 into intimate contact with the wall of the mold cavity and to press the laminae 17, 18 and 19 into intimate contact with each other. Subsequently, the mold 24 is heated in any suitable manner to vulcanize the various rubber components of the ball, thereby bonding the laminae 17, 18 and 19 together so that the wall structure 13 of the ball is, in effect, of integral construction. Subsequently, the finished ball 10 is deflated and removed from the mold.

The ball 10, as thus far described, is conventional, and it will be understood that the hereinbefore-described wall structure 13 and method of making it per se form no part of the present invention, the invention residing in the provision of a molded ball having means for attachment of the removable lacing 11.

As best shown in Fig. 4 of the drawing, the wall structure 13 of the ball 10 is provided with a pocket 30 intermediate the laminae 17 and 18. In the particular construction illustrated in Fig. 4 of the drawing, the pocket 30 is disposed between the bladder 17 and the reinforcing layer 18, although it may be located between the reinforcing layer 18 and the cover 19 as indicated in Fig. 7.

Also, if more than one reinforcing layer is employed, the pocket 30 may be formed between adjacent ones of such reinforcing layers. This construction is illustrated in Fig. 8 of the drawings, two fabric reinforcing layers 18a and 18b being interposed between the bladder 17 and the cover 19. The pocket 30 is disposed between the reinforcing layers 18a and 18b.

That portion of the wall structure 13 of the ball 10 which overlies the pocket 30 therein is provided with an opening therethrough, such opening preferably being a slit 31 which communicates with the pocket and which extends substantially from one end thereof to the other, stop holes 32 being provided at the ends of the slit. The portion of the wall structure overlying the pocket is provided with a row of holes 33 on each side of the slit 31, the holes 33 communicating with the pocket 30. The lacing 11 is threaded through the holes 33 and across the slit 31 in the usual manner. The slit 31 is provided primarily to facilitate punching of the holes 33; obviously, it may be omitted if the holes 33 are formed otherwise than by a conventional punching operation.

We prefer to locate the pocket 30 between the bladder 17 and the reinforcing layer 18, when only one reinforcing layer is used, the reason for this being that the reinforcing layer thus reinforces the holes 33 through which the lacing 11 is threaded. In order to avoid weakening the wall structure of the ball because of the presence of the slit 31 in the reinforcing layer 18, we prefer to provide another layer or insert 34 of fabric or other suitable material of substantially the same size and shape as the pocket 30 and bond this insert to the reinforcing layer 18 outwardly of the pocket so that it forms the outer wall thereof, thereby further reinforcing the wall of the ball at this point. Also, the fabric insert 34 provides somewhat more bulk in the vicinity of the lacing 11, thereby simulating more closely the characteristics of a conventional leather-covered ball with removable bladder. The insert 34, however, may be omitted if desired. For example, the insert 34 may be omitted in the embodiment of Fig. 8 where the pocket 30 is disposed between the two reinforcing layers 18a and 18b. In this construction, the outer reinforcing layer 18b serves to reinforce the holes 33 through which the lacing 11 is threaded.

Considering the method of our invention, after the partially inflated bladder 17 has been formed, the fabric insert 34 is placed thereon at the point where the pocket 30 is to be formed. A layer 36 of separating material, such as fabric or paper, for example, is placed between the insert 34 and the bladder 17 to prevent bonding of the insert to the bladder so as to form the pocket 30. After the separating layer 36 and the insert 34 have been applied to the bladder 17, the reinforcing layer 18 and cover 19 are applied thereto. Of course, alternatively, if no insert 34 is used the layer 36 is placed directly upon the bladder 17 in the desired position before adding the layer 18 and cover 19. Also, in the embodiment of Fig. 8, the separating layer is placed between the reinforcing layers 18a and 18b.

Subsequently, the ball is placed in the mold cavity 25 and heated to cure the components of the ball so as to bond the layers 17, 18 and 19 together. Simultaneously, the fabric insert 34 is bonded to the reinforcing layer 18. The separating layer 36 prevents bonding in the area occupied thereby so as to provide the desired pocket 30.

After curing, the ball is deflated and removed from the mold, and the slit 31, or other opening, the stop holes 32, and the lacing holes 33 are formed in the portion of the wall structure of the ball which overlies the pocket 30, the lacing holes being formed by a punch, for example, inserted into the pocket through the slit 31. Subsequently, the lacing 11 is threaded through the holes 33 and across the slit 31 in the usual manner.

As hereinbefore indicated, providing the ball 10 with the removable lacing 11 in the foregoing manner results in surface characteristics closely simulating those of a conventional leather-covered ball so that the handling characteristics of the ball 10 more nearly duplicate those to which skilled players are accustomed.

It will be apparent that some air may be trapped in the pocket 30 when the reinforcing layer 18 and cover 19 are placed over the separating layer 36 in the construction presently under consideration. Subsequently, when the ball 10 is cured in the mold 24 by the application of heat thereto, the pressure of the air trapped in the pocket 30 will increase so that, upon removal of the ball from the mold, such increased pressure of the air in the pocket tends to cause the portion of the reinforcing layer 18 and cover 19 overlying the pocket to bulge outwardly. In order to avoid such bulging upon removal of the ball from the mold, and in order to avoid possible separation of the reinforcing layer 18 from the bladder 17 as a result thereof, the pocket 30 is preferably vented to the atmosphere before removing the ball from the mold. The preferred method of doing this is illustrated best in Figs. 1 and 2 of the drawing and will now be described.

Before the ball is placed in the mold to be cured, a vent hole 37 is formed through the reinforcing layer 18 and the cover 19 in the area occupied by the pocket 30. A piece 38 of gas-pervious material, such as paper or string, for example, is then inserted in the vent hole before the ball is placed in the mold and cured. The mold is provided with an opening 39 to receive the piece 38 of gas-pervious material. The gas-pervious material prevents closing of the vent hole 37 as the ball is vulcanized and conducts any air trapped in the pocket 30 outwardly to prevent the development of an excessive pressure in the pocket, which is a feature of our invention.

In Fig. 6 of the drawing, we show an alternative method of venting the pocket 30. In this method, no opening such as the vent hole 37 is initially provided, the reinforcing layer 18 and cover 19 being punctured with a hollow needle 40, which may be inserted through the opening 39 in the mold, after curing and prior to removal of the ball therefrom so as to permit any air trapped in the pocket under superatmospheric pressure to escape therefrom.

A further alternative method of relieving excess gas pressure in the pocket 30 after curing of the ball 10 is to circulate a cooling fluid, such, for example, as cold water, through the mold 24 while the ball 10 is still therein. This reduces the temperature of any gas or vapor in the pocket, with a corresponding drop in fluid pressure exerted by the trapped gas or vapor to a value at which it will not cause separation of the laminae when the ball is removed from the mold.

In Fig. 7 of the drawing, we show an alternative embodiment wherein the pocket 30 is formed between the reinforcing layer 18 and the cover 19, instead of being formed between the bladder 17 and the reinforcing layer 18. In this embodiment the separating layer 36 is placed on the reinforcing layer 18, instead of on the bladder 17. Also, in the embodiment illustrated in Fig. 7, the slit 31 is formed by providing a fold 41 in the separating layer 36 which extends outwardly through the cover 19, this fold preventing bonding of the edges of the slit together when the ball is cured.

The fold 41 in the separating layer 36 performs another function in that it serves to vent the pocket 30 if a gas-pervious material is used for the separating layer. A gas-impervious material may also be used by providing openings at the outer end of the fold 41 for venting purposes. In the construction illustrated in Fig. 7, the fabric insert 34 has been omitted.

It will also be apparent that the separating layer 36 of the form of the invention shown in Fig. 1 and 2 may be formed to provide a fold similar to the fold 41, in which case such fold would extend up through the layers 18 and 19.

It is also to be noted that separation of the layers between which the pocket is provided, due to an increase in gas pressure in the pocket during molding, can be eliminated or substantially reduced by providing thread stitching around the pocket through the layers forming the same. If the construction is as shown in Fig. 7, in which the pocket is formed between the cover 19 and the reinforcing layer 18, the stitching would be through the cover and reinforcing layer and could be in the design of the stitching 27 shown in Fig. 5, or otherwise as desired.

Also, we have found that certain moldable materials may be used for the cover 19 with sufficient inherent strength to permit the lacing 11 to be threaded only through the holes 33 in the cover, and, consequently, we do not desire to be limited to a construction in which the lacing is threaded through holes in two or more layers of the wall 13. It is also to be understood that although we have described the bladder 17 as bonded to the reinforcing layer 18, in the form of the invention disposing the pocket 30 between other layers the bladder may be a conventional, separate, replaceable bladder insertable through a suitable opening in the wall of the ball, as is well known in the art.

It is further to be noted that although we prefer to form the pocket 30 as an integral part of the ball 10, it may be formed as a separate, relatively small piece of wall construction which is then bonded to exterior of the ball 10. In this embodiment, a small section composed of two layers, such as the layers 18 and 19 as shown in Fig. 7, with the pocket 30 and separating layer 36 therebetween, may be bonded together and the resulting unit being bonded to the exterior of a conventional ball, or such layers with the pocket and separating material therebetween can merely be laid on the exterior of a conventional ball before it is given its final cure, curing the ball and bonding the additional layers thereon and together.

A construction along the lines of that described in the preceding paragraph is illustrated in Fig. 9 of the drawing, the numerals 13, 14, 17, 18, 19, 30, 31 and 33 identifying the same components as previously. In this construction, an inner rubberized fabric patch 51 of the same size as the pocket 30 is applied to the reinforcing layer 18, the under or inner side of this patch having previously been coated, as indicated by the numeral 52, with a synthetic-resin separating material of the character described previously, a vinyl chloride and vinylidene chloride copolymer being an example. Over the inner patch 51 is a similar, but larger, patch 53 which extends beyond the inner patch around the entire periphery thereof, the cover 19 being applied over the patches, and the holes 33 and slit 31 extending through the cover and the patches to the pocket 30.

With this construction, when the ball is vulcanized, the coating 52 prevents bonding of the inner patch 51 to the layer 18 to form the pocket 30 but the outer patch 53 is bonded to the inner patch and is bonded to the layer 18 around the periphery of the inner patch, the cover being bonded to the outer patch and to the layer 18 around the outer patch. Thus, two fabric plies overlie the pocket 30, and the slit 31 and holes 33 are subsequently formed in the manner hereinbefore described.

One advantage of the method of Fig. 9 is that, because of the fact that no air-entrapping separating layer is used (the synthetic-resin coating 52 entrapping no air), only a negligible amount of air, if any, is entrapped in the pocket 30 when the patches 51 and 53 are applied. In view of this, and in view of the fact that the coating 52 generates no gas when heated, no more than a negligible pressure build up in the pocket 30 occurs during molding so that no venting is required, which is an important feature.

Although we have disclosed various exemplary embodiments of our invention for purposes of illustration, it will be understood that the invention is not necessarily limited thereto since various changes, modifications, and substitutions may be incorporated in such embodiments without departing from the spirit of the invention. Consequently, we hereby reserve the right to all such changes, modifications, and substitutions as come within the scope of the invention.

We claim as our invention:

1. In a method of making an athletic ball of the character described, the steps of: providing an inflatable body having approximately the size and shape of the finished ball; and bonding to said body a pocket member, said pocket member being formed by bonding two layers of moldable material together with a smaller layer of separating material therebetween, said separating material preventing bonding together of said layers of moldable material throughout the area of said separating material, so as to form a pocket between said layers of moldable material.

2. The method defined in claim 1 wherein said layer of separating material includes a layer of moldable material coated with a bond preventing synthetic resin.

3. The method defined in claim 1 wherein said layer of separating material includes a layer of moldable material coated on its inner side with a bond preventing synthetic resin.

4. The method of claim 3 wherein said synthetic resin does not generate gas when said body and said pocket member are heated.

5. The method of claim 1 including the step of venting said pocket.

6. In a method of making an athletic ball of the character described, the steps of: providing an inflatable body having approximately the size and shape of the finished ball; placing a layer of separating material on said body, said layer occupying only a small portion of the surface area of said body; placing an outer layer of material over the exposed surface of said body and over said layer of separating material; bonding said outer layer to said body, said layer of separating material preventing bonding of said outer layer to said body in the area occupied by said layer of separating material so as to form a pocket between said outer layer and said body; forming a slit through said outer layer into said pocket; and forming lacing holes in said outer layer on either side of said slit which communicate with said pocket and which are adapted to receive a lacing.

7. The method of claim 6 wherein said separating material does not generate gas when said body and said layers thereon are heated.

8. The method of claim 6 including the step of placing a gas conducting member in communication with said pocket and with the exterior of said outer layer to serve as a vent.

9. A method as set forth in claim 6, in which said outer layer is bonded to said body in a mold by the application of heat thereto, said method including the additional step of relieving gas pressure built up in said pocket during the molding operation and before said body is removed from the mold, so as to prevent such gas pressure from causing separation of said outer layer from said body when said body is removed from the mold.

10. A method as set forth in claim 9, in which such gas pressure is relieved by venting the pocket to the atmosphere.

11. A method as set forth in claim 9, in which such gas pressure is relieved by reducing the temperature of the mold before removal of the body therefrom.

12. A method as set forth in claim 9, in which such gas pressure is relieved by forming a vent hole through said outer layer and inserting a piece of gas-pervious material in said vent hole prior to placing said body in the mold.

13. In a method of making a wall construction for an inflatable athletic ball, the combination of: providing a first layer of moldable material; placing a second layer of moldable material against said first layer, said second layer being smaller than said first layer and having a coating of separating material on its inner side; placing a third layer of moldable material against said second and first layers, said third layer being larger than said second layer so that it engages both said first and second layers; and bonding said second and third layers and the overlapping portions of said first and third layers together, said coating preventing the bonding of said first and second layers together throughout the area of said second layer and forming a pocket between said first and second layers.

14. The method of claim 13 wherein said coating is a synthetic resin which does not form a gas when heated.

15. The method of forming an inflated ball having a bladder, the steps of laying on the bladder a plurality of plies of fabric having adhesive thereon to form a multiply casing therearound and including between the plies a layer of adhesion-resistant material; placing the ball in a mold and subjecting the ball to heat and pressure to adhere the plies together, the layer of adhesion-resistant material preventing the plies from adhering together throughout the extent thereof and forming a pocket between the plies of the casing; removing the ball from the mold and forming a slit through the adhered outer plies to said pocket; punching a row of holes in the outer plies on each side of the slit; and inserting a lace through the holes to draw the sides of the slit together.

References Cited in the file of this patent

UNITED STATES PATENTS

| Number | Name | Date |
|--------|------|------|
| 2,575,414 | Gow et al. | Nov. 20, 1951 |